United States Patent [19]

Smith et al.

[11] Patent Number: 5,403,240
[45] Date of Patent: Apr. 4, 1995

[54] CAM FOR VARIABLE WIDTH PULLEY

[75] Inventors: J. Douglas Smith, Martinez, Ga.;
David Moulton, North Augusta, S.C.

[73] Assignee: Club Car, Inc., Augusta, Ga.

[21] Appl. No.: 219,275

[22] Filed: Mar. 29, 1994

[51] Int. Cl.⁶ .............................................. F16H 59/00
[52] U.S. Cl. ............................................. 474/8; 474/19
[58] Field of Search ........................ 474/8, 10, 11–13, 474/17, 19, 21, 25

[56] References Cited

U.S. PATENT DOCUMENTS

| | | |
|---|---|---|
| 3,195,364 | 2/1963 | Pauli . |
| 3,279,270 | 10/1966 | Pacak . |
| 3,616,706 | 11/1971 | Shimamoto . |
| 3,722,308 | 3/1973 | Steuer . |
| 4,033,195 | 7/1977 | Takagi et al. . |
| 4,036,068 | 7/1977 | Gilbert . |
| 4,173,155 | 11/1979 | Togami et al. . |
| 4,378,221 | 3/1983 | Huff et al. ............................ 474/19 |
| 4,403,976 | 9/1983 | Takagi . |
| 4,523,917 | 6/1985 | Schildt . |
| 4,568,317 | 2/1986 | Steuer . |
| 4,585,429 | 4/1986 | Marier . |
| 4,592,737 | 6/1986 | Ohont . |
| 4,826,467 | 5/1989 | Reese et al. . |
| 4,976,657 | 12/1990 | Takano ............................ 474/19 X |

Primary Examiner—Michael Powell Buiz
Attorney, Agent, or Firm—Nies, Kurz, Bergert & Tamburro

[57] ABSTRACT

A cam for axially shifting the pulley faces of a variable width, torque sensing V-belt pulley in a variable speed, belt-type transmission system. The cam includes a plurality of cam lobes that extend in an axial direction at a predetermined radial distance from the pulley axis. Each cam lobe is triangular and is symmetrical about a cam lobe axis that is parallel with the pulley axis, and each cam lobe includes two cam surfaces that engage with respective cam followers to change the pulley face spacing as the load on the belt changes. The cam surfaces are convex and are in the form of circular arcs. The transmission system incorporating the cam structure is particularly suitable for vehicular use, and it provides improved performance by reducing engine overspeed upon initial acceleration and provides a smoother backshift when climbing hills.

13 Claims, 5 Drawing Sheets

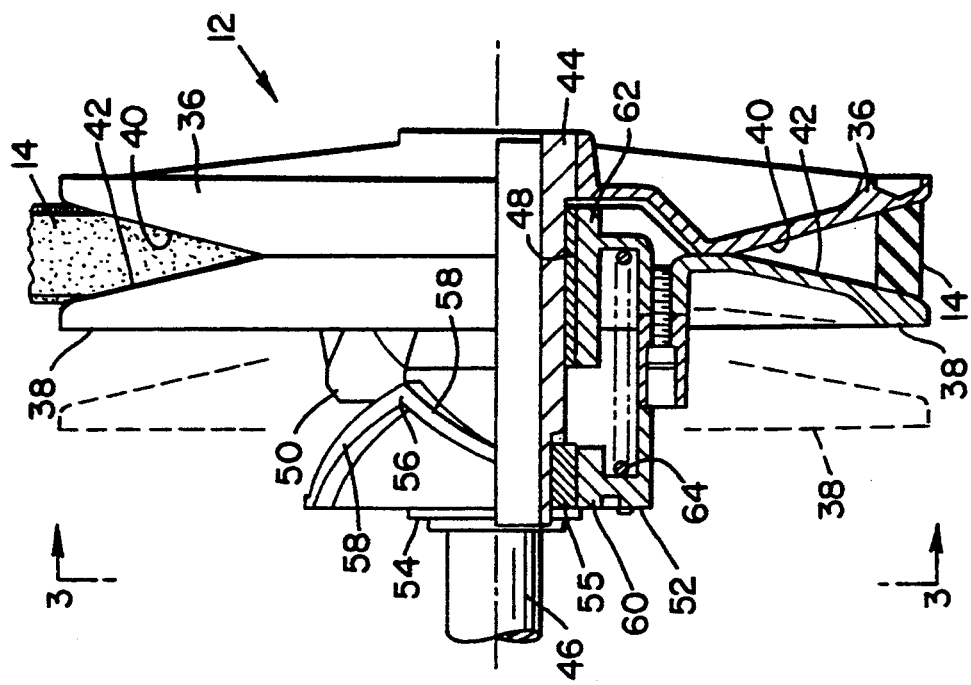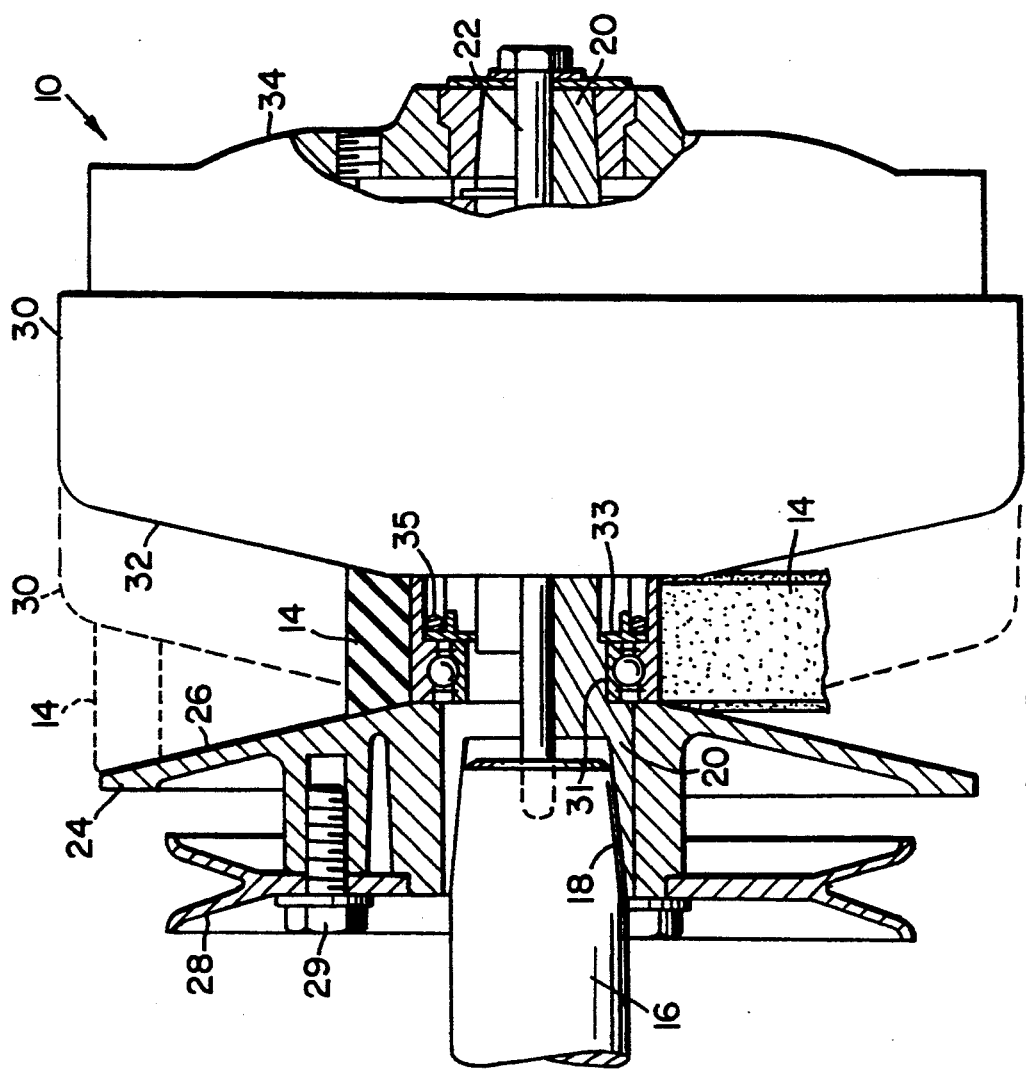

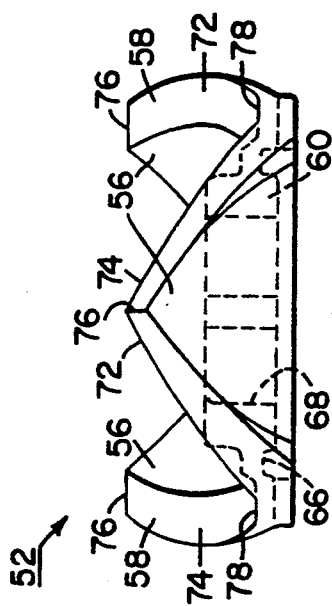
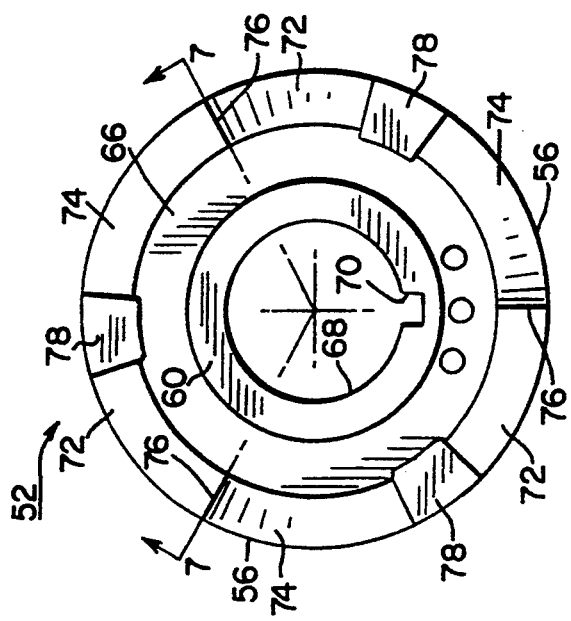
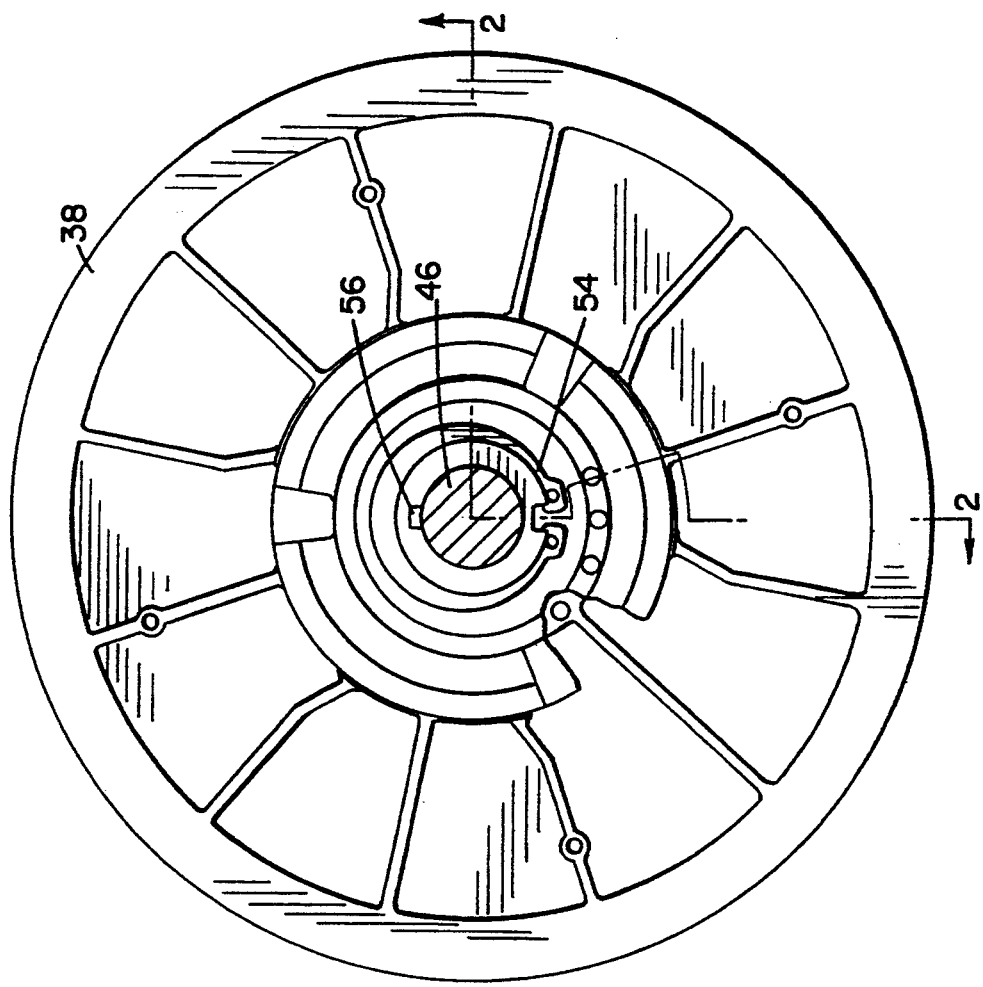

CAM FOR VARIABLE WIDTH PULLEY

BACKGROUND OF THE INVENTION

1. Field of the Invention

The present invention relates to a driven pulley structure forming part of a continuously-variable, V-belt-type power transmission. More particularly, the present invention relates to a variable width driven pulley structure, wherein the driven pulley includes an improved cam surface profile in which the separation between the pulley-engaging drive faces is controlled by a cam arrangement including a convex cam surface that provides improved performance for a vehicle in which a belt-type transmission utilizing the improved cam surface profile is installed.

2. Description of the Related Art

Continuously variable, V-belt-type power transmissions utilizing variable width drive and driven pulleys are well known. Such power transmissions are utilized on a wide variety of vehicles, including automobiles, utility vehicles, and golf carts, among others. The transmissions provide a stepless transfer of power from an electric motor or a gasoline engine to a driven output shaft that is operatively connected with one or more drive wheels of the vehicle. Additionally, such transmissions provide an advantage when applied to vehicles in that they respond automatically to changing load requirements by sensing the need for changes in input torque to the driving wheels. For example, when a vehicle is proceeding uphill and additional torque is required to maintain speed, the necessary increase in transmission output torque operates to increase the pull of the drive belt on the driven pulley, causing the faces of the driven pulley to move toward each other, to thereby increase the effective drive radius of the driven pulley and to decrease the effective drive radius of the driving pulley, as a result of which the torque at the transmission output shaft is increased.

Several patents disclose the provision of a cam and cam follower arrangement to govern the rate of movement of the pulley faces toward and away from each other in response to the torque demands placed upon the pulley structure. For example, in U.S. Pat. No. 3,722,308, which issued on Mar. 27, 1973, to Herbert Steuer, there is disclosed a variable spacing pulley in which a generally circular cam element is provided that has a concave cam surface that curves gradually in the axial direction of the pulley.

In U.S. Pat. No. 4,173,155, which issued on Nov. 6, 1979, to Paul G. Togami, et al., shows a torque sensing drive in which a two lobe, circular cam member is provided, wherein the cam surfaces between the cam lobes are defined by concave, generally parabolic curves.

In U.S. Pat. No. 4,826,467, which issued on May 2, 1989, to Terry L. Reese, et al., and which is assigned to the assignee of the present application, a variable spacing pulley structure is disclosed in which a circular cam surface having three cam lobes is disclosed. The cam surfaces are defined by triangular cam lobes in the form of helical surfaces that have a constant angular pitch, which when viewed in two-dimensional, developed form are straight lines. That cam surface configuration has been found to be generally acceptable and has been used in commercially available golf cars, utility vehicles, and the like. However, at times the engine that powers such vehicles will tend to overspeed on initial acceleration, and the shift into a higher torque mode during hill climbing is less abrupt than is desired.

Other patents that disclose such pulleys having flat, rectilinear cam surfaces include U.S. Pat. Nos. 4,403,976; 4,523,917; 4,585,429; and 4,592,737.

It is an object of the present invention to provide an improved cam profile to provide smoother operation and to avoid engine overspeed upon initial acceleration.

It is another object of the present invention to provide an improved cam profile to provide improved hill-climbing performance in a vehicle incorporating such a transmission arrangement.

SUMMARY OF THE INVENTION

Briefly stated, in accordance with one aspect of the present invention, a cam is provided for a belt-type variable speed power transmission. The cam includes a cam body having a longitudinal axis and a central bore for mounting the body on a rotatable shaft. Drive means are provided for drivingly connecting the cam body with the shaft for rotation therewith. A plurality of cam surfaces are carried by the cam body, and are spaced radially outwardly from the cam body longitudinal axis and extend in an axial direction from the cam body at a predetermined radial distance from the cam body longitudinal axis. The cam surfaces are circumferentially disposed and extend at an angle relative to a transverse plane that is perpendicular to the cam body longitudinal axis. Each of the cam surfaces is convex, to impart to cam followers that come into contact with the cam surfaces, non-linear movement in a direction parallel with the cam body longitudinal axis.

BRIEF DESCRIPTION OF THE DRAWINGS

FIG. 1 is a side elevational view, partially in section, of a driving pulley forming part of a belt-type variable speed transmission.

FIG. 2 is a side elevational view, in quarter-section, of a driven pulley that is adapted to be belt driven by a belt connected with a driving pulley of the type shown in FIG. 1, and that incorporates a cam in accordance with the present invention, taken along the line 2—2 of FIG. 3.

FIG. 3 is an end view of the driven pulley assembly shown in FIG. 2, viewed along the line 3—3 thereof.

FIG. 4 is a side elevational view of a prior art cam used on a continuously variable belt-type power transmission.

FIG. 5 is a top plan view of the cam shown in FIG. 4.

DESCRIPTION OF THE PREFERRED EMBODIMENTS

Figure 7:
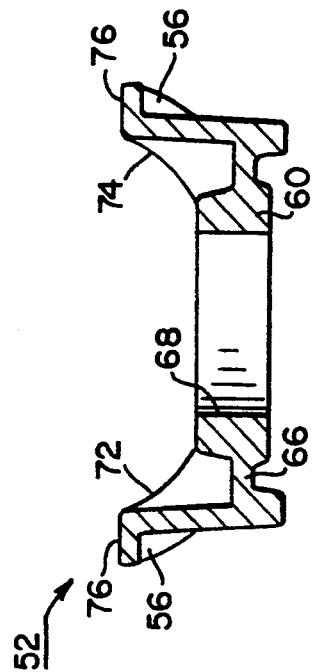
FIG. 7 is a cross-sectional view of the cam shown in FIG. 5, taken along the line 7—7 thereof.
Figure 6:
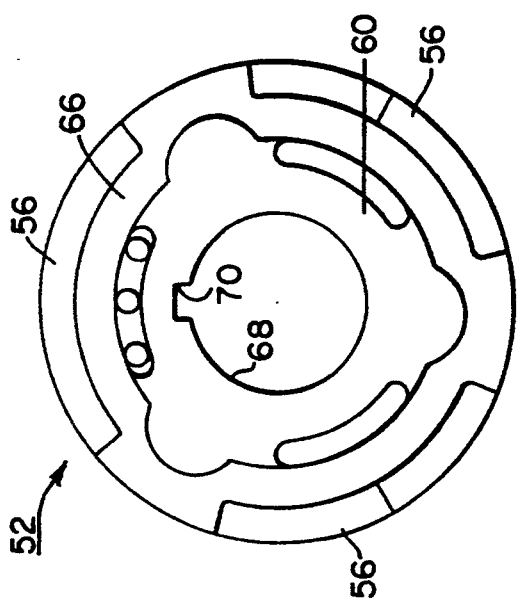
FIG. 6 is a bottom plan view of the cam shown in FIG. 4.

Referring now to the drawings, and in particular to FIGS. 1 and 2 thereof, there are shown a driving pulley 10 and a driven pulley 12. A V-belt 14 passes over each of pulleys 10 and 12 to form part of a continuously variable, belt-type power transmission system. Driving pulley 10 is adapted to be connected to a source (not shown) of rotational power that provides power to driving pulley 10 through an input power drive shaft 16 that extends into and is driving received in a bore 18 of a pulley drive sleeve 20 that can include a standard morse taper, or the like. Input power drive shaft 16 is secured to pulley drive sleeve 20 by means of a connecting bolt 22 that extends axially through pulley drive sleeve 20 and is threadedly received in the tapered outer end of input power drive shaft 16.

Surrounding pulley drive sleeve 20 and drivingly connected therewith is a fixed pulley wall member 24 that includes a frustoconical contact surface 26 that is inclined relative to the axis of pulley drive sleeve 20. Fixed pulley wall member 24 defines one belt-contacting wall of driving pulley 10. Contact surface 26 is fixed relative to the longitudinal axis of pulley drive sleeve 20 and will hereinafter sometimes be referred to as the fixed pulley face.

Drivingly connected with fixed pulley wall member 24 on the side opposite belt-contacting surface 26 is a fixed diameter V-belt pulley 28 that is secured to fixed pulley wall member 24 by means of bolts 29, or the like. Fixed diameter pulley 28 is adapted to receive a V-belt (not shown) that is connected with an electrically operated starter-generator (not shown) to provide starting torque through input power drive shaft 16 to initially start a gasoline engine (not shown) that is the source of the power to driving pulley 10. After the engine has been started and is running smoothly, fixed pulley 28 serves as a power-take-off to drive the starter-generator after it has completed the starting mode and is in the generating mode, in order to provide electrical energy to maintain the charge of a starting battery (not shown), as will be appreciated by those skilled in the art.

Facing fixed pulley wall member 24 and spaced axially therefrom along the axis of input power drive shaft 16 is a movable pulley wall member 30 that includes a frustoconical contact surface 32 that is inclined relative to the longitudinal axis of drive shaft 16. Contact surface 32 and contact surface 26 are each inclined in opposite directions, relative to the axis of drive shaft 16, and they can be inclined at the same or at different acute angles relative to the drive shaft axis, to define a V-shaped annular slot to receive V-belt 14. Movable pulley wall member 30 rotates with drive sleeve 20 and is axially slidably carried thereon on a suitable sleeve bearing (not shown). In that regard, driving pulley 10 can have the structure of the driving pulley shown in U.S. Pat. No. 4,826,467, the disclosure of which is hereby incorporated herein by reference to the same extent as if fully rewritten herein.

Spaced axially outwardly from movable pulley wall member 30 is a drive hub 34 that is axially fixed relative to pulley drive sleeve 20 and is drivingly secured thereto by connecting bolt 22 and by a key (not shown) to rotate therewith. Thus, movable pulley wall member 30 is movable axially relative to drive hub 34 between the full line position shown in FIG. 1 to the dashed line position shown to the left of the full line position. A helical compression spring 35 extends between a bearing retainer 33, that is fixed to drive sleeve 20 and serves to retain in proper position an idler bearing 31 for V-belt 14, and the interior of movable pulley wall member 30 to urge wall member 30 to the fully open position shown in full lines in FIG. 1.

As shown in FIG. 2, driven pulley 12 has a structure similar to that of driving pulley 10 in that it includes a fixed pulley wall member 36 and a movable pulley wall member 38. Each of pulley wall members 36 and 38 include opposed frustoconical contact surfaces 40, 42, respectively, that contact the sides of V-belt 14 that passes around driven pulley 12. The spacing between contact surfaces 40 and 42 determines the effective driving radius of V-belt 14 as it is received in the V-shaped groove defined between the respective fixed and movable wall members. Fixed pulley wall member 36 is secured to a driven sleeve member 44, which can be drivingly connected with a driven or output shaft 46, such as by means of a key (not shown) or the like.

Movable pulley wall member 38 is axially slidably carried on driven sleeve member 44, and is also rotatable relative thereto over a limited circumferential distance. A sleeve bearing 48 carried by wall member 38 permits both axial and rotational movement of wall member 38 relative to wall member 36. Positioned on the outermost surface of movable pulley wall member 38, on the opposite face from contact surface 42, are three circumferentially equidistantly spaced cam followers 50 (only one of which is visible in FIG. 2). Cam followers 50 are each positioned at a predetermined radius from the axis of driven sleeve member 44.

A rotatable cam member 52 is fixed axially relative to driven sleeve member 44, such as by a snap ring 54, and is drivingly carried by sleeve member 44 through a drive key 55. Cam member 52 is positioned axially opposite cam followers 50 and carries three circumferentially spaced, axially extending, generally V-shaped cam lobes 56, to correspond with the number of cam followers 50. Cam lobes 56 each include respective cam surfaces 58 that are spaced radially from the axis of driven sleeve member 44 to engage with the respective cam followers.

Extending between the hub 60 of cam member 52 and the hub 62 of movable pulley wall member 38 is a torsion-compression spring 64 that has one end thereof received in and connected to hub 62 and has the other end received in and connected to hub 60. Spring 64 urges movable pulley member 38 axially toward fixed pulley member 36.

The structure of a prior art cam member 52 is shown in greater detail in FIGS. 4 through 7. The cam member there shown has the cam structure that is shown and described in U.S. Pat. No. 4,826,467, which is owned by the assignee of the present application. Cam member 52 includes a disc-shaped body portion 66 that includes hub 60. A bore 68 extends through hub 60 and includes a keyway 70 to receive key 55 (see FIG. 2).

At the outermost end of disc-shaped body portion 66 are three equidistantly circumferentially spaced cam lobes 56 that extend axially relative to the axis of hub 60, and in the same axial direction. Cam lobes 56 each include respective cam surfaces 58 that have a V-shaped configuration when viewed from the side, as in FIG. 4.

Each cam surface 58 is defined by a pair of ramp-like surfaces 72, 74 that are angularly inclined relative to the longitudinal axis of cam member 52 and that meet at cam surface peaks 76. Ramp-like surface 72 defines a rise portion of cam surface 58, which permits movable pulley wall member 38 to move both toward and away from fixed pulley wall member 36, against the force of spring 64, depending upon the load applied to the transmission. Ramp-like surface 74 defines a fall portion of the cam surface, which is operative when the driven pulley rotates in the opposite direction of rotation.

Between each of the respective spaced cam lobes 56 is a dwell area 78, the surface of which lies in a transverse plane that is perpendicular to the longitudinal axis of cam member 52. The distance between the respective dwell areas and the cam lobe peaks, measured in the direction of the longitudinal axis of cam member 52, defines the maximum total axial travel of the respective cam followers. Each of ramp surfaces 72 and 74 is defined by a constant helix angle, which is a straight line function of the rotational position of cam member 52.

Figure 8:
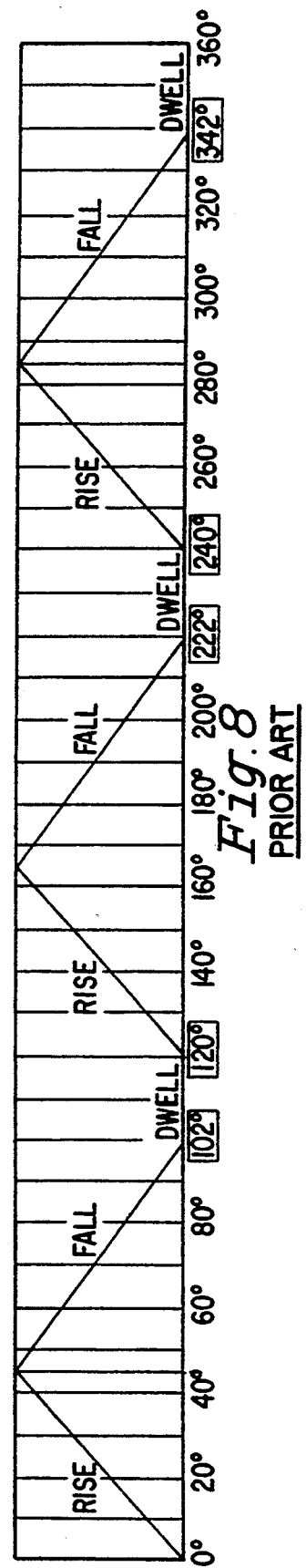
FIG. 8 is a displacement diagram showing the displacement of a cam follower for one revolution of the cam shown in FIGS. 4 through 7.

FIG. 8 is a displacement diagram showing the relative orientation of the respective ramp-like cam surfaces as a function of circumferential position of the cam followers 50 and as viewed in a developed form in a two-dimensional representation. As shown, each of the cam lobes is so configured that the respective rise portions are straight lines, and they extend from a dwell area to a cam surface peak to provide a rectilinear rise portion having an arc length of 44° 32'35". Similarly, the respective fall portions are also straight lines, and they extend from a cam surface peak to the next succeeding dwell area at a point spaced 102° of arc from the initial point of the rise portion, to provide a rectilinear fall portion having an arc length of 57° 27'25". The maximum rise and maximum fall for the cam lobe structure illustrated in FIG. 8 is 1.015 inches. The dwell areas of the cam surface shown in developed form in FIG. 8 each extend over an arc length of 18°.

Figure 11:
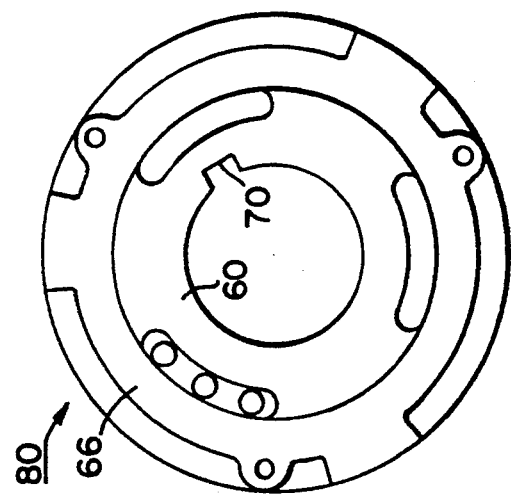
FIG. 11 is a bottom plan view of the cam shown in FIG. 9.
Figure 10:
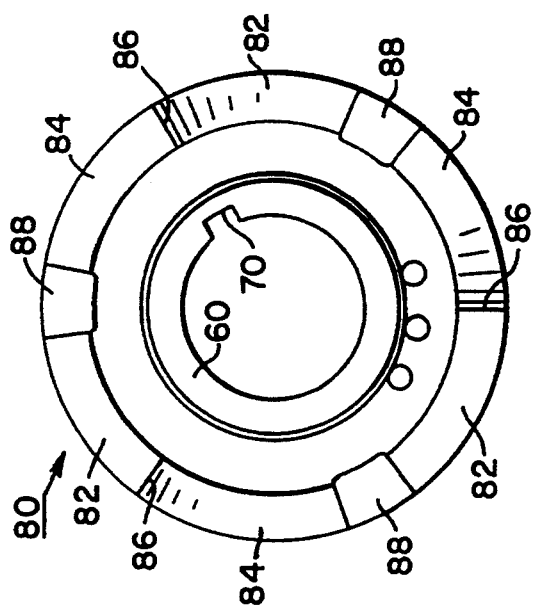
FIG. 10 is a top plan view of the cam shown in FIG. 9.
Figure 9:
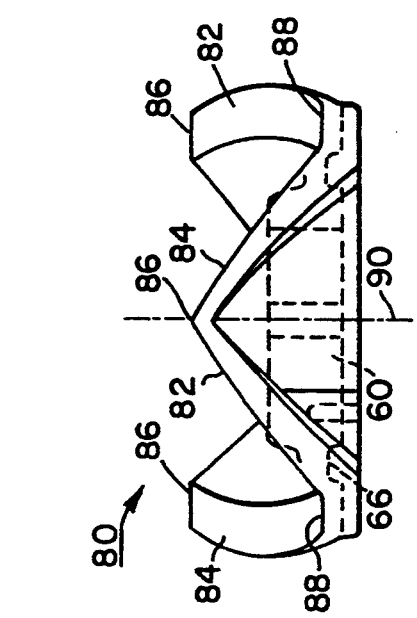
FIG. 9 is a side elevational view of a cam similar to the cam shown in FIGS. 4 through 7, but incorporating a cam profile in accordance with the present invention.
Figure 12:
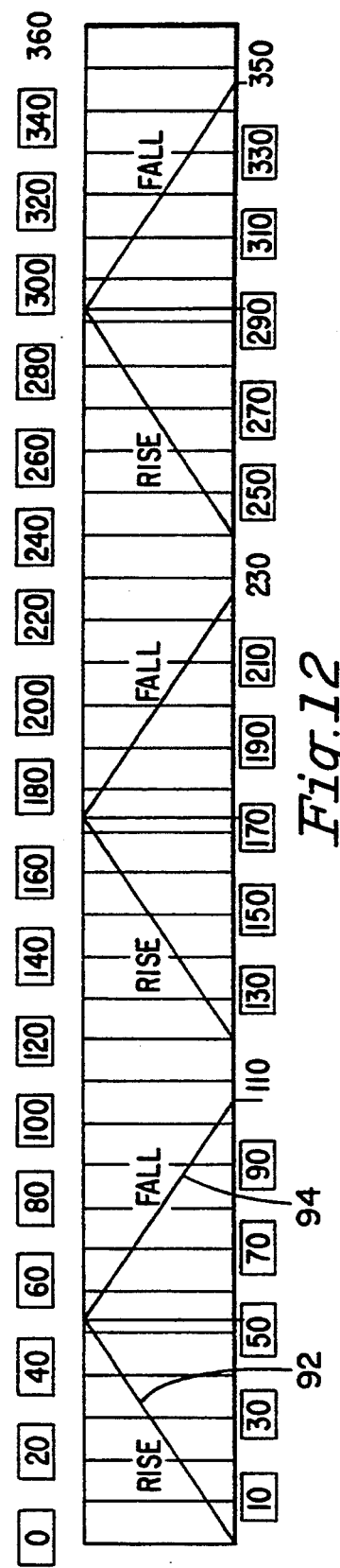
FIG. 12 is a displacement diagram showing the displacement of a cam follower for one revolution of the cam shown in FIGS. 9 through 11.
Figure 15:
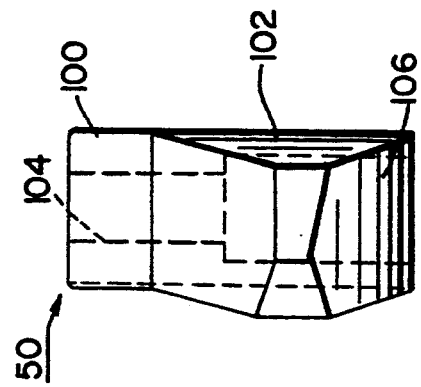
FIG. 15 is an end view of the cam follower shown in FIG. 13.
Figure 14:
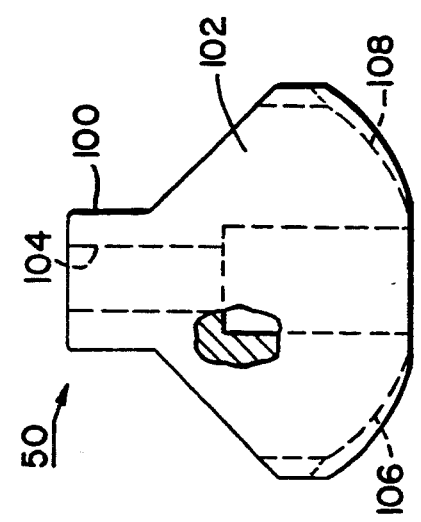
FIG. 14 is a front elevational view of the cam follower shown in FIG. 13.
Figure 13:
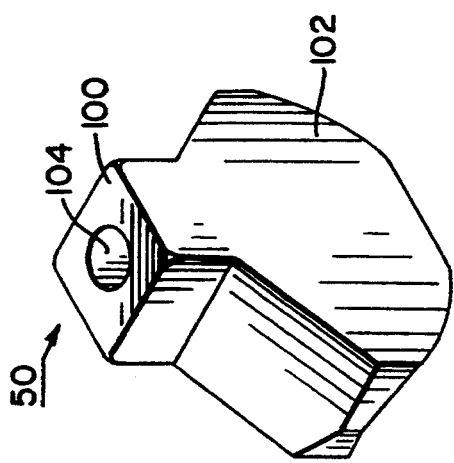
FIG. 13 is a perspective view of a cam follower for use with the cam profile in accordance with the present invention.
Figure 17:
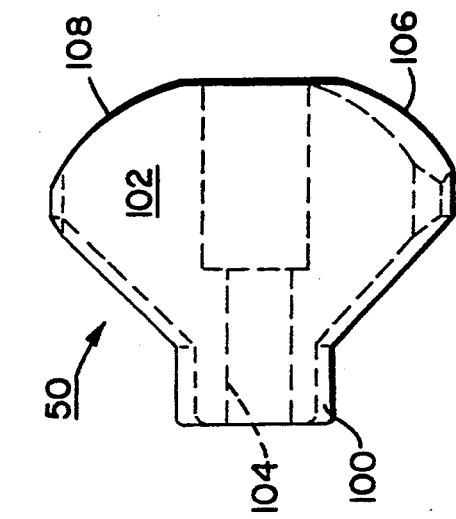
FIG. 17 is a side view of the cam follower shown in FIG. 13 and taken along the line 17—17 of FIG. 16.

The improved cam member in accordance with the present invention is shown in its physical form in FIGS. 9 through 11, and its cam surfaces are shown in developed form in FIG. 12. Structurally, cam member 80 is similar to that of the prior art cam member 52 shown in FIGS. 4 through 7, except for the shapes and configuration of the cam surfaces, the arc lengths of the respective cam surfaces, and the resulting cam timing diagram. In that regard, cam member 80 includes a hub 60, a disc-shaped body 66, a bore 68, and a keyway 70 that are shown in the same form as the corresponding parts of cam member 52 for the embodiment of the prior art cam member shown in FIGS. 4 through 8.

As best seen in FIG. 12, the improved cam as illustrated provides a maximum axial traverse of a cam follower of 1.015 inches, as in the previously-described embodiment. However, the cam surface includes a ramp surface 82 that defines the rise portion of the cam surface, and a ramp surface 84 that defines the fall portion of the cam surface. The cam surface peaks 86 define one end point of the path of travel of the cam follower, and the dwell areas 88 extend between adjacent ramp surfaces 82 and 84.

Although the rise and fall portions of the prior art cam member shown in FIGS. 4 through 8 are of unequal arc length, the rise and fall portions defined by the ramp surfaces 82 and 84 of the improved cam member 80 shown in FIGS. 9 through 12 are of equal arc lengths. In each of the rise and fall portions of the improved cam member the respective cam surfaces extend over an arc length of 53° 12' and have a radial width of 0.425 inches, relative to the longitudinal axis of cam member 80. Thus, each of the cam lobes of the improved cam member is symmetrical about a cam lobe centerline 90 that is spaced radially from and is oriented parallel with the longitudinal axis of cam member 80, and that passes through a respective cam surface peak 86. Additionally, each of the dwell areas 88 of the improved cam has an arc length of 13° 36', which is smaller than the dwell area arc length of the prior art structure. As a result of the symmetrical configuration of the cam lobes, a transmission incorporating the improved cam structure will provide the same performance whether the cam followers move in a clockwise or in a counter-clockwise direction relative to the cam structure.

Another distinct and very significant difference between the improved cam structure in accordance with the present invention and the prior art cam structure lies in the fact that the respective ramp surfaces 82 and 84 are each of a convex shape, so that the resulting movement of the cam follower as it moves along the respective ramp surfaces is non-linear. As shown in FIG. 12, each of the rise and fall portions of the cam surface defines a circular arc that extends from a dwell area to a cam surface peak. The straight line cam surfaces of the prior art structure shown in FIGS. 4 through 8 are superimposed on FIG. 12 and are represented by rectilinear rise lines 92 and rectilinear fall lines 94. In the cam structure illustrated in FIGS. 9 through 12 the rise and fall portions of the cam surface are each defined by circular arcs having a radius of 8.594 inches, which provides a preferred ratio of cam surface curvature to cam surface maximum height of 8.457.

Figure 16:
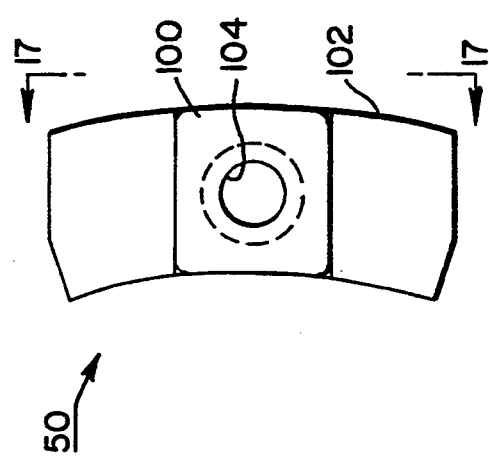
FIG. 16 is a top view of the cam follower shown in FIG. 13.

FIGS. 13 through 17 show the preferred structure of the cam followers for use with the convex cam profile in accordance with the present invention. A shown, cam follower 50 includes a stem 100 and a follower body 102. As best seen in FIG. 16, cam follower body 102 is arc-shaped, preferably having an arc radius that corresponds with the radial position of the cam surfaces. Stem 100 includes a throughbore 104 to receive a connecting bolt (not shown) to permit connection of the cam follower with the outwardly facing surface of movable pulley wall member 38. Three equidistantly circumferentially spaced cam followers are positioned on wall member 38 at substantially the same radial distance at which the respective cam surfaces 72 and 74 are positioned.

Cam follower body 102 includes at its outermost surfaces, opposite stem 100, a pair of cam contact surfaces 106, 108, each of which is also convexly curved. Contact surfaces 106 and 108 are symmetrically positioned relative to the axis of throughbore 104, and each surface is so disposed as to provide line contact with corresponding cam surfaces 72 and 74. Preferably, the radius of curvature of each of cam follower surfaces 106, 108 is about 0.612 inches. As will be apparent, each of cam follower surfaces 106, 108 defines a helically disposed, convex cam follower surface that permits line contact with respective cam surfaces 72 and 74, but each cam follower surface also permits a variable line of contact as the cam followers move circumferentially relative to the cam surfaces, to minimize surface wear of the cam follower surfaces.

In operation, and referring initially to FIGS. 1 and 2, the respective faces of the driving and driven pulleys are shown in full lines in their initial position, at which time the drive shaft is either stopped or is at an idle speed condition, which is a relatively low rotational speed of input power drive shaft 16. At that condition V-belt 14 is at its innermost radial position in drive pulley 10, and the innermost surface of the belt is in contact with the outer race of idler bearing 31. At the same time, V-belt 14 is at its radially outermost position in driven pulley 12, and because at the idle speed condition the belt is not in firm frictional contact with fixed pulley wall member 24 of driving pulley 10, no driving force is applied to the belt, and both the belt and driven shaft 46 are in a stationary condition.

The normal design for such a belt-drive transmission is based upon the anticipated maximum output torque requirement during operation of the transmission. The slope of the linear cam surface is then determined so that the transmission responds by back-shifting when maximum torque is demanded. Although such a linear cam surface design is adequate and normally works well at maximum torque, it has been found to compromise performance at the normal operating conditions by producing excessively high belt squeeze forces at lower torques. As a result, an engine operated through such a transmission system is caused to overspeed during acceleration. Previously, the slope of the cam was compromised to help eliminate the overspeed condition. But that compromise also affected performance at maximum torque by providing inadequate belt squeeze force to transmit the maximum torque, and thus performance at maximum torque suffered. The present invention, on the other hand, provides a convex cam profile that permits the engine to operate at maximum efficiency at all output torque requirement levels. In that regard, the cam profile is, in essence, tuned for maximum torque at the backshift condition, and is also tuned for the more typical operating condition during which the engine operates at a constant engine speed at lower output torque requirement conditions and during variations in acceleration.

As the engine is accelerated and the rotational speed of input power drive shaft 16 increases above the idle speed, the centrifugal force acting on weights (not shown) contained between drive hub 34 and movable pulley wall member 30 causes wall member 30 to move toward fixed pulley wall member 24, to the left as viewed in FIG. 1. As a result, V-belt 14 rides upwardly in the V-shaped slot defined between wall members 24 and 30 and is shifted radially outwardly relative to the longitudinal axis of drive shaft 16. The pulley contact surfaces 26 and 32 drivingly engage the side surfaces of V-belt 14 to cause driven pulley 12 to rotate.

When the engine rotational speed, and that of input power drive shaft 16, is relatively low, but is above the idle speed, V-belt 14 will ride in the driven pulley at some intermediate position radially outwardly of the longitudinal axis of driven shaft 46. As V-belt 14 moves radially outwardly within driving pulley 10, it correspondingly moves radially inwardly within driven pulley 12. Consequently, movable pulley wall member 38 of driven pulley 12 is caused to move away from fixed pulley wall member 36 and thereby imparts a greater rotational speed to driven shaft 46. A further increase in the rotational speed of the engine to its predetermined maximum speed will cause the parts to assume the dashed line positions as shown in each of FIGS. 1 and 2, whereupon driven shaft 46 will be rotating at its maximum rotational speed.

When the vehicle is travelling along a level surface, the lateral spacing between the respective wall members of the driving and driven pulleys will adjust to provide the necessary driving torque, dependent upon the engine speed and the load imposed by the vehicle and its load. However, when the vehicle experiences an incline, at which time increased torque is demanded by the driven pulley to move the vehicle up the incline, the increase in demanded torque of the driven shaft will increase the pull of the V-belt on the driven pulley, thereby causing the movable wall member 38 to rotate in the direction of movement of the drive belt, relative to the fixed face, and will cause cam followers 50 carried by movable wall member 38 to move angularly relative to fixed wall member 36 and to slide along the respective portions of helical cam surfaces 58. As a result, movable wall member 38 will be forced to move toward fixed wall member 36, thereby causing V-belt 14 to ride within driven pulley 12 at a greater radial distance, relative to the longitudinal axis of driven shaft 46. At the same time, belt 14 is caused to ride at a smaller radial distance within driving pulley 10, to reduce the effective drive radius of driving pulley 10, thereby providing an increase in the drive ratio between the driving pulley and the driven pulley, and a consequently higher torque at the wheels of the vehicle.

Although the prior art cam having the structure and displacement characteristic illustrated in FIGS. 4 through 8 is generally satisfactory, it has been found that the continuously variable convex cam surface profile of the cam having the structure and displacement diagram shown in FIGS. 9 through 12 provides improved performance when a transmission arrangement of the type shown in FIGS. 1 and 2 is utilized in a vehicle, such as a golf car. The continuously variable cam profile, as compared with the constant cam profile of the prior art structure shown in FIGS. 4 through 8, has been found to provide surprisingly increased performance at the operating extremes of the transmission. As was earlier noted, the disclosed transmission operates to sense the torque requirements and to adjust the drive pulley spacing to respond to the greater or lesser amounts of torque that are required to maintain a particular operating condition. With the improved cam profile of the present invention, the steep initial angle provided by the cam profile reduces the tendency for the engine to overspeed upon startup of the vehicle from a rest condition. The normal tendency for such an engine upon initial acceleration from a standing stop is for the engine to operate at a very high speed, and the present invention reduces that operating tendency. Consequently, engine noise is reduced, making it more comfortable to ride in such a vehicle.

As the cam followers move along their respective cam surfaces to the end-most positions of their travel, because the cam surfaces are less steep in those areas, the transmission more smoothly provides a back shift into a lower drive ratio to thereby produce better hill climbing performance for the vehicle. The result is improved, smoother performance of the vehicle.

Cam followers 50 are so configured with a helical, convex cam contact surface that movement of the followers relative to the respective cam surfaces results in line contact between the cam surface and the cam follower surface. However, the line of contact is not in a fixed position on the cam follower, but is, instead, variable along the cam follower surface as the follower moves along the cam surface. As a result, wear of the cam follower surface is minimized, to thereby extend its useful service life.

Although particular embodiments of the present invention have been illustrated and described, it will be apparent to those skilled in the art that various changes and modifications can be made without departing from the spirit of the present invention. Accordingly, it is intended to encompass within the appended claims, all such changes and modifications that fall within the scope of the present invention.

What is claimed is:

1. A cam for a belt-type, variable speed power transmission, said cam comprising:
   (a) a cam body having a longitudinal axis and a central bore for mounting the body on a rotatable shaft, and drive means carried by the cam body for drivingly connecting the cam body with the shaft for rotation therewith; and
   (b) a plurality of cam surfaces spaced radially outwardly from the cam body longitudinal axis and extending in an axial direction from the cam body at a predetermined radial distance from the cam body longitudinal axis, wherein the cam surfaces are circumferentially disposed and extend at an angle relative to a transverse plane that is perpendicular to the cam body longitudinal axis, wherein each of the cam surfaces is convex to impart to cam followers that come into contact with the cam surfaces non-linear movement in a direction parallel with the cam body longitudinal axis.

2. A cam in accordance with claim 1 wherein the cam surfaces are carried on a plurality of cam lobes that extend substantially parallel with the cam body longitudinal axis.

3. A cam in accordance with claim 2 wherein each cam lobe includes a pair of cam surfaces that extend from a cam lobe peak to an adjacent cam dwell area to define substantially V-shaped cam lobes.

4. A cam in accordance with claim 2 wherein the cam lobes are symmetrical about respective axes spaced from and parallel with the cam body longitudinal axis.

5. A cam in accordance with claim 2 wherein the cam body includes at least three cam lobes, each of which carries a pair of cam surfaces.

6. A cam in accordance with claim 2 wherein the cam lobes are substantially equally circumferentially spaced about the cam body.

7. A cam in accordance with claim 1 wherein the convex cam surfaces are defined by circular arcs.

8. A cam in accordance with claim 7 wherein the radius of each of the circular arcs is about 8.6 inches.

9. A cam in accordance with claim 8 wherein the ratio of the radius of the cam surface arc to the cam height in the direction of the cam body longitudinal axis is about 8.45.

10. A pulley for a continuously-variable, belt-type transmission, said pulley comprising:
    (a) a pair of spaced, axially aligned, inclined face disc surfaces for providing a variable pulley diameter dependent upon the axial spacing between the inclined disc surfaces; and
    (b) a plurality of cam surfaces carried by one of said disc surfaces and a plurality of corresponding cam followers carried by the other of said disc surfaces, the cam surfaces having a convex cam surface configuration.

11. A pulley in accordance with claim 10 including a plurality of cam followers equal in number to the number of cam surfaces, each cam follower having a pair of cam follower surfaces that are convexly curved relative to an axis that is radially spaced from and that extends substantially parallel with a pulley longitudinal axis to provide variable line contact between the cam surfaces and the cam follower surfaces.

12. A cam for shifting a movable pulley wall member relative to a fixed pulley wall member for changing the radial position of a belt carried by the pulley defined by the fixed and movable wall members, said cam comprising:
    (a) a rotatable body member including connecting means for connecting the body member with a rotatable shaft having a longitudinal axis;
    (b) a plurality of cam lobes carried by the body member and extending parallel with the shaft longitudinal axis, each cam lobe including cam surfaces positioned at a predetermined radial distance from the shaft longitudinal axis, wherein the cam surfaces are convexly curved and are defined by surfaces that are oriented to extend substantially perpendicularly relative to the shaft longitudinal axis, and having a predetermined radial width.

13. A cam in accordance with claim 12 wherein the ratio of the arc length of the cam lobe surface to the arc length of the surface of the dwell area is about 8.

* * * * *